(12) United States Patent
Johnson et al.

(10) Patent No.: US 6,580,950 B1
(45) Date of Patent: Jun. 17, 2003

(54) INTERNET BASED HOME COMMUNICATIONS SYSTEM

(75) Inventors: Jeff Johnson, West Fargo, ND (US); Dan Schulz, Fargo, ND (US); Thor Iverson, Fargo, ND (US); Dan Malmstrom, Fergus Falls, MN (US)

(73) Assignee: Echelon Corporation, San Jose, CA (US)

( * ) Notice: Subject to any disclaimer, the term of this patent is extended or adjusted under 35 U.S.C. 154(b) by 0 days.

(21) Appl. No.: 09/561,091

(22) Filed: Apr. 28, 2000

(51) Int. Cl.[7] ............................................... G05B 11/01
(52) U.S. Cl. ............................ 700/17; 700/83; 345/733
(58) Field of Search ................................. 700/9, 17, 65, 700/83, 1, 19, 90; 709/218–220; 345/329, 733

(56) References Cited

U.S. PATENT DOCUMENTS

| | | | |
|---|---|---|---|
| 4,418,333 A | * 11/1983 | Schwarzbach et al. | 340/310.01 |
| 5,809,265 A | * 9/1998 | Blair et al. | 345/764 |
| 5,903,226 A | * 5/1999 | Suman et al. | 340/825.69 |
| 5,956,487 A | * 9/1999 | Venkatraman et al. | 709/218 |
| 5,982,445 A | * 11/1999 | Eyer et al. | 348/461 |
| 6,021,324 A | * 2/2000 | Sizer, II et al. | 455/403 |
| 6,058,355 A | * 5/2000 | Ahmed et al. | 702/62 |
| 6,138,150 A | * 10/2000 | Nichols et al. | 709/219 |
| 6,139,177 A | * 10/2000 | Venkatraman et al. | 700/83 |
| 6,161,133 A | * 12/2000 | Kikinis | 709/220 |
| 6,182,094 B1 | * 1/2001 | Humpleman et al. | 707/513 |
| 6,198,479 B1 | * 3/2001 | Humpleman et al. | 345/329 |
| 6,243,707 B1 | * 6/2001 | Humpleman et al. | 707/102 |
| 6,288,716 B1 | * 9/2001 | Humpleman et al. | 345/329 |
| 6,353,853 B1 | * 3/2002 | Gravlin | 709/219 |
| 6,359,892 B1 | * 3/2002 | Szlam | 370/401 |
| 2002/0111698 A1 | * 8/2002 | Graziano et al. | 700/17 |
| 2002/0152311 A1 | * 10/2002 | Veltman et al. | 709/227 |
| 2002/0180579 A1 | * 12/2002 | Nagaoka et al. | 340/3.1 |

* cited by examiner

*Primary Examiner*—John Follansbee
*Assistant Examiner*—Ronald D Hartman, Jr.
(74) *Attorney, Agent, or Firm*—Blakely, Sokoloff, Taylor & Zafman, LLP

(57) ABSTRACT

An Internet based home communications system for allowing a homeowner to monitor and control various features of their home from a distant location via a global computer network. The inventive system comprises a plurality of control devices positioned within a home, a control unit in communication with the plurality of control devices wherein the control unit is connected to a global computer network (i.e. Internet), and a data center having server computers connected to the global computer network and in communication with the control unit. The homeowner can view, monitor and control features of their home through the web page such as viewing interior images of their home or adjusting the thermostat for the interior of their home. In addition, the control unit may notify the appropriate supplier when propane or food becomes low within the home through the global computer network.

41 Claims, 11 Drawing Sheets ns
INTERNET BASED HOME COMMUNICATIONS SYSTEM

BACKGROUND OF THE INVENTION

1. Field of the Invention

The present invention relates generally to home monitoring systems and more specifically it relates to an Internet based home communications system for allowing a homeowner to monitor and control various features of their home from a distant location via a global computer network such as the Internet.

Our society has become extremely mobile with the reduced expense and ease of travel leaving many homes unattended while the homeowner is traveling or at work. Many homeowners hire "house sitters", friends or neighbors to either monitor or stay at their home during their absence to insure that the home is in the desired condition. Other homeowners are forced to abandon their home without any monitoring or control. Some homeowners have more than one home, such as a summer home, and must leave at least one of the homes unoccupied and unmonitored. Hence, there is a need for a home monitoring system that allows a homeowner to monitor their home from a distant location.

2. Description of the Prior Art

Home monitoring systems have been in use for years. Typically, a home monitoring system is comprised of a security system that notifies the security agency when there has been a breach of security within the residence. The security agency may then call the homeowner at their place of work notifying them of the condition of their home.

However, conventional home monitoring systems do not allow the homeowner to monitor their home from a distant location. In addition, conventional home monitoring systems do not allow the homeowner to control the operations of the home from a distant location. Many homeowners are forced to purchase the services of house sitters that can be expensive and can significantly reduce the privacy most homeowners enjoy and desire to protect.

While conventional home security systems may be suitable for monitoring burglary within a home, they are not as suitable for allowing a homeowner to monitor and control various features of their home from a distant location via a global computer network. Conventional home security systems simply do not allow the homeowner to monitor the conditions of their home while in a remote location without having a third person visit their home.

In these respects, the Internet based home communications system according to the present invention substantially departs from the conventional concepts and functions of the prior art, and in so doing provides a system primarily developed for the purpose of allowing a homeowner to monitor and control various features of their home from a distant location via a global computer network.

SUMMARY OF THE INVENTION

In view of the foregoing disadvantages inherent in the known types of home monitoring systems now present in the prior art, the present invention provides a new Internet based home communications system wherein the same can be utilized for allowing a homeowner to monitor and control various features of their home from a distant location via a global computer network.

The general purpose of the present invention, which will be described subsequently in greater detail, is to provide a new Internet based home communications system that has many of the advantages of the home based monitoring systems mentioned heretofore and many novel features that result in a new Internet based home communications system which is not anticipated, rendered obvious, suggested, or even implied by any of the prior art home based monitoring systems, either alone or in any combination thereof.

To attain this, the present invention generally comprises a plurality of control devices positioned within a home, a control unit in communication with the plurality of control devices wherein the control unit is connected to a global computer network (i.e. Internet), and a data center having server computers connected to the global computer network and in communication with the control unit. The control devices may be comprised of various units such as lighting controls, heating controls, moisture controls, freeze controls, pet feeding devices, propane gauge, interior cameras, exterior cameras, security system, smoke alarm and various other devices that can be utilized to monitor and control the home. The homeowner is capable of monitoring and controlling the control device within the home by accessing a web page displayed by the data center through a conventional web browser on a computer. The homeowner can view, monitor and control features of their home through the web page such as viewing interior images of their home or adjusting the thermostat for the interior of their home. In addition, the control unit may notify the appropriate supplier when propane or food becomes low within the home through the global computer network.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an Internet based home communications system that will overcome the shortcomings of the prior art devices.

A second object is to provide an Internet based home communications system for allowing a homeowner to monitor and control various features of their home from a distant location via a global computer network.

Another object is to provide an Internet based home communications system that allows a homeowner to monitor images taken from within or outside of the home.

An additional object is to provide an Internet based home communications system that allows the homeowner to control features of their home through a global computer network.

A further object is to provide an Internet based home communications system that allows the user to monitor, control and modify various control devices within a home through the Internet.

Another object is to provide an Internet based home communications system that alerts the homeowner through e-mail of various alerts such as a burglary, fire or temperature extremes.

A further object is to provide an Internet based home communications system that monitors supplies within the home and that can notify product providers of the need for more supplies such as food or heating fuel.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
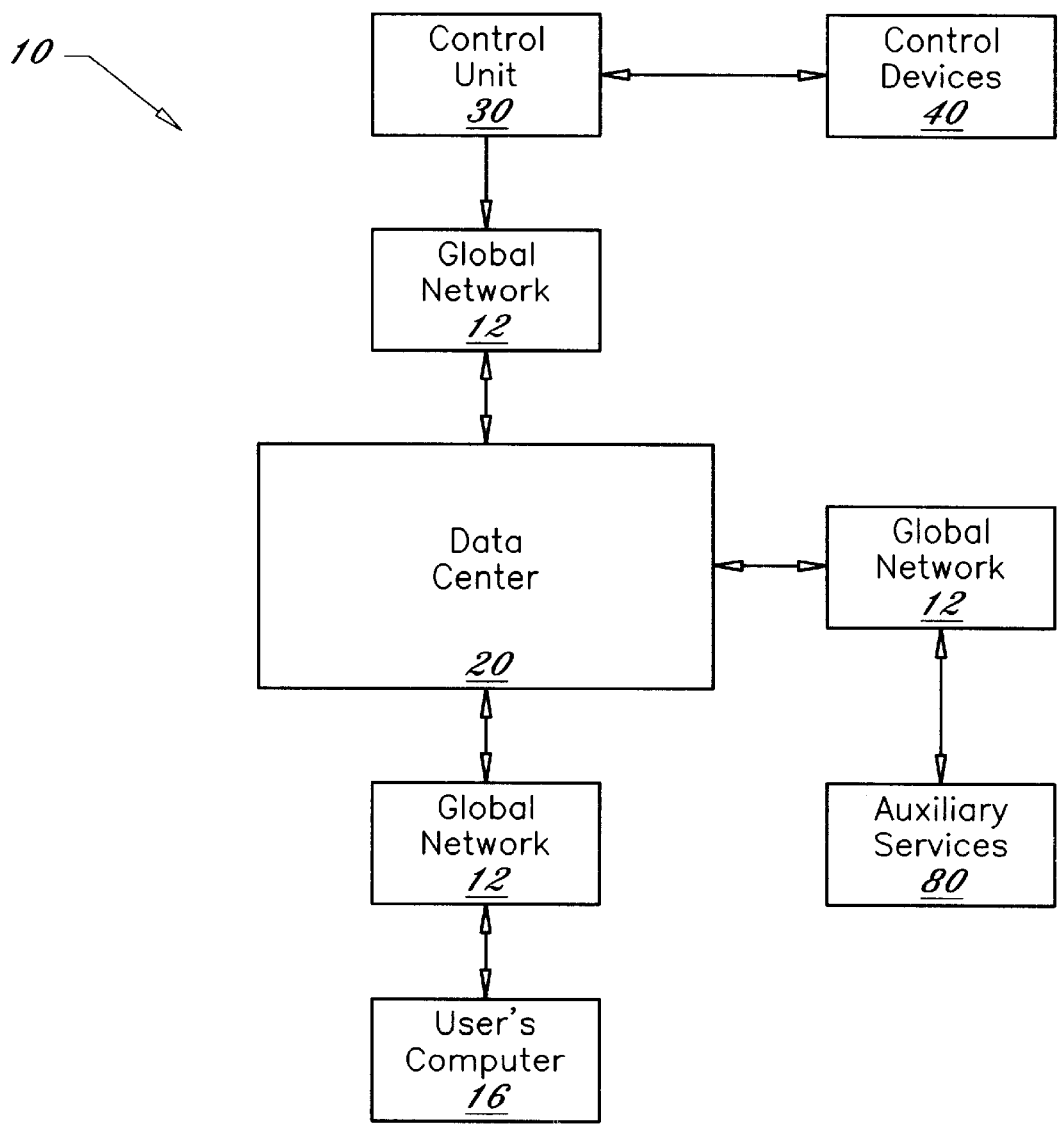
FIG. 1 is a block illustration of the present invention showing the communication from a homeowner's computer to a control unit within the home through a global computer network.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a global communications network, such as the Internet.

A. Invention Overview

The Internet based home communications system 10 broadly comprises a plurality of control devices 40 positioned within a home, a control unit 30 in communication with the plurality of control devices 40 wherein the control unit 30 is connected to a global computer network 12 (i.e. Internet), and a data center 20 having server computers connected to the global computer network 12 and in communication with the control unit 30. The control devices 40 may be comprised of various units such as lighting controls 42, heating controls 44, moisture controls 46, freeze controls 48, pet feeding devices 50, propane gauge 54, interior cameras 56, exterior cameras 58, security system 60, smoke alarms 62, health monitoring devices 64 and various other devices that can be utilized to monitor and control the home. The homeowner is capable of monitoring and controlling the control device within the home by accessing a web page displayed by the data center 20 through a conventional web browser 14 on a computer. The homeowner can view, monitor and control features of their home through the web page such as viewing interior images 74 of their home or adjusting the thermostat for the interior of their home. In addition, the control unit 30 may notify the appropriate supplier when propane or food becomes low within the home through the global computer network 12.

B. Data Center

As shown in FIG. 1 of the drawings, a data center 20 comprised of one or more server computers is in communication with a global computer network 12 such as the Internet utilizing a conventional communications system such as a telephone modem, cable modem, digital subscriber line (DSL) integrated services digital network (ISDN), T1, T3, OC3 or other communications system. The data center 20 is capable of receiving, storing and transmitting various types of data related to the homeowner's home such as text, software, music, sound, temperature data, images 74, photographs, graphics, video, alerts, messages, advertisements, promotions or other information related to a home (collectively, the "data").

C. Control Unit

As further shown in FIG. 1 of the drawings, a control unit 30 is in communication with the data center 20 through the global computer network 12 utilizing a conventional communications system such as a telephone modem, cable modem, digital subscriber line (DSL) integrated services digital network (ISDN), T1, T3, OC3 or other communications system. The control unit 30 is capable of communicating with the data center 20 and other entities 80 through the global computer network 12. The control unit 30 may be comprised of conventional electronics well-known in the art. The control unit 30 further can be connected to local computers within the home thereby allowing the homeowner to control and monitor the home through the control unit 30.

Figure 8:
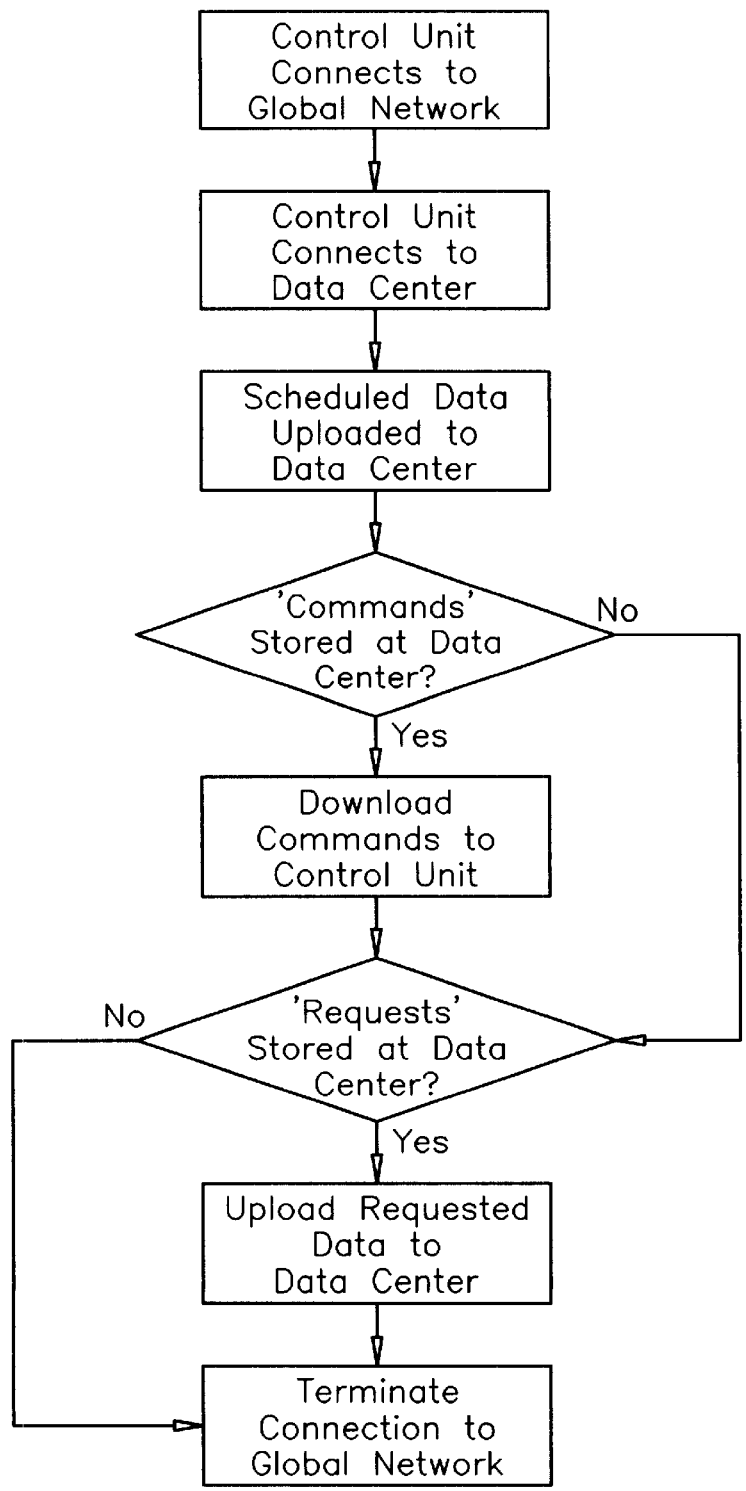
FIG. 8 is a flowchart showing the operation of the control unit as it connects to the data center through the global computer network.
Figure 10:
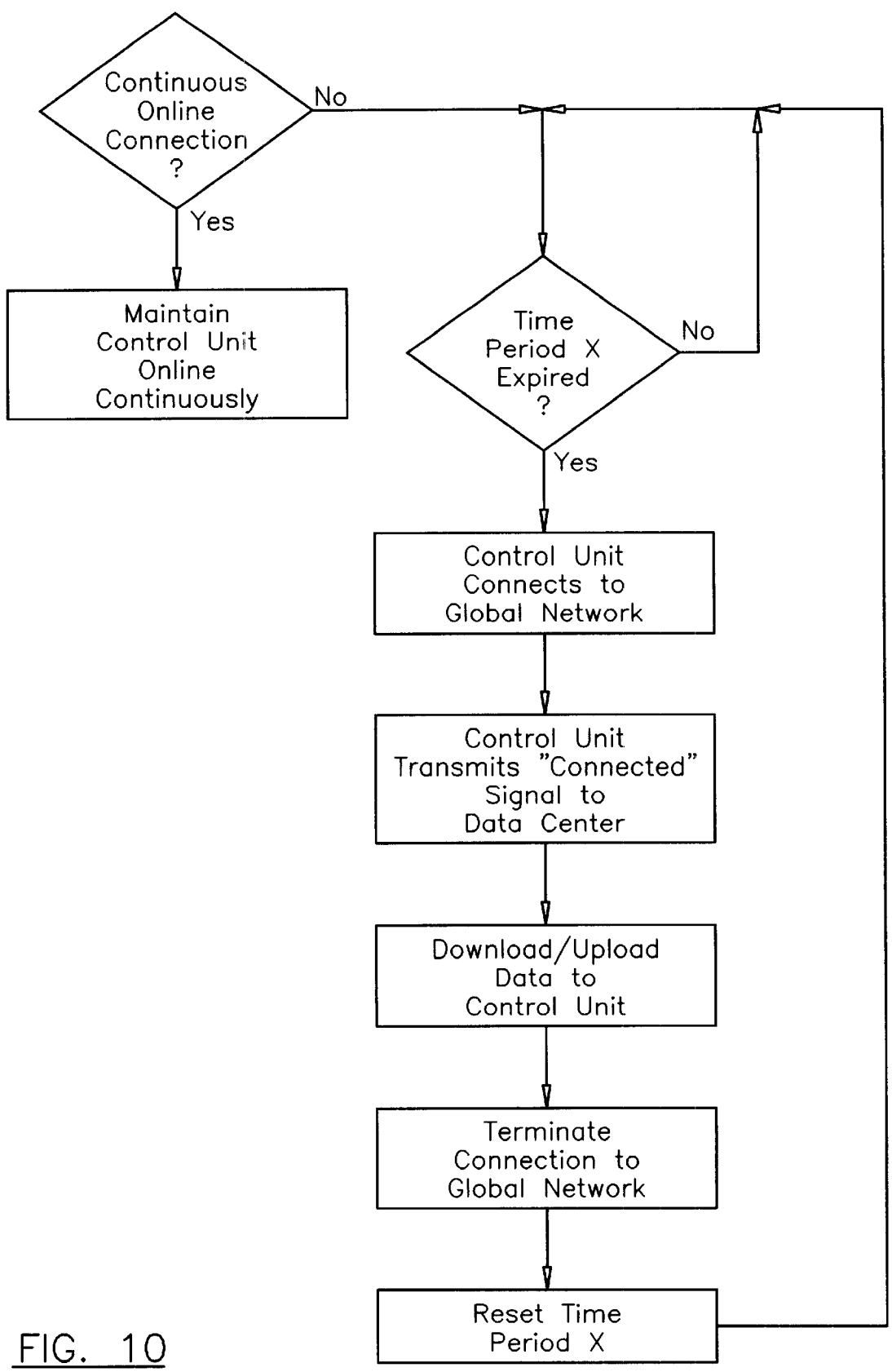
FIG. 10 is a flowchart showing the operation of the control unit intermittently connecting to the data center via the global computer network.

The control unit 30 can be programmed to connect to the global computer network 12 either full-time, periodically or only when an event occurs from one of the control devices 40. As shown in FIG. 10 of the drawings, the control unit 30 may be programmed to connect online to the data center 20 based upon a specified period X or upon scheduled intervals. As further shown in FIG. 10 of the drawings, the control unit 30 connects to the global computer network 12 and then transmits a "connected" signal to the data center 20 to inform the data center 20 that it is connected online. The control unit 30 then may upload any scheduled or requested data to the data center 20 as further shown in FIGS. 8 and 10 of the drawings. The control unit 30 may also download any data from the data center 20 such as commands from the homeowner. After the data has been properly uploaded and downloaded, the control unit 30 terminates the connection to the global computer network 12 while simultaneously resetting the time period X. After time period X has passed again, the control unit 30 repeats the above connection process to the data center 20.

Figure 11:
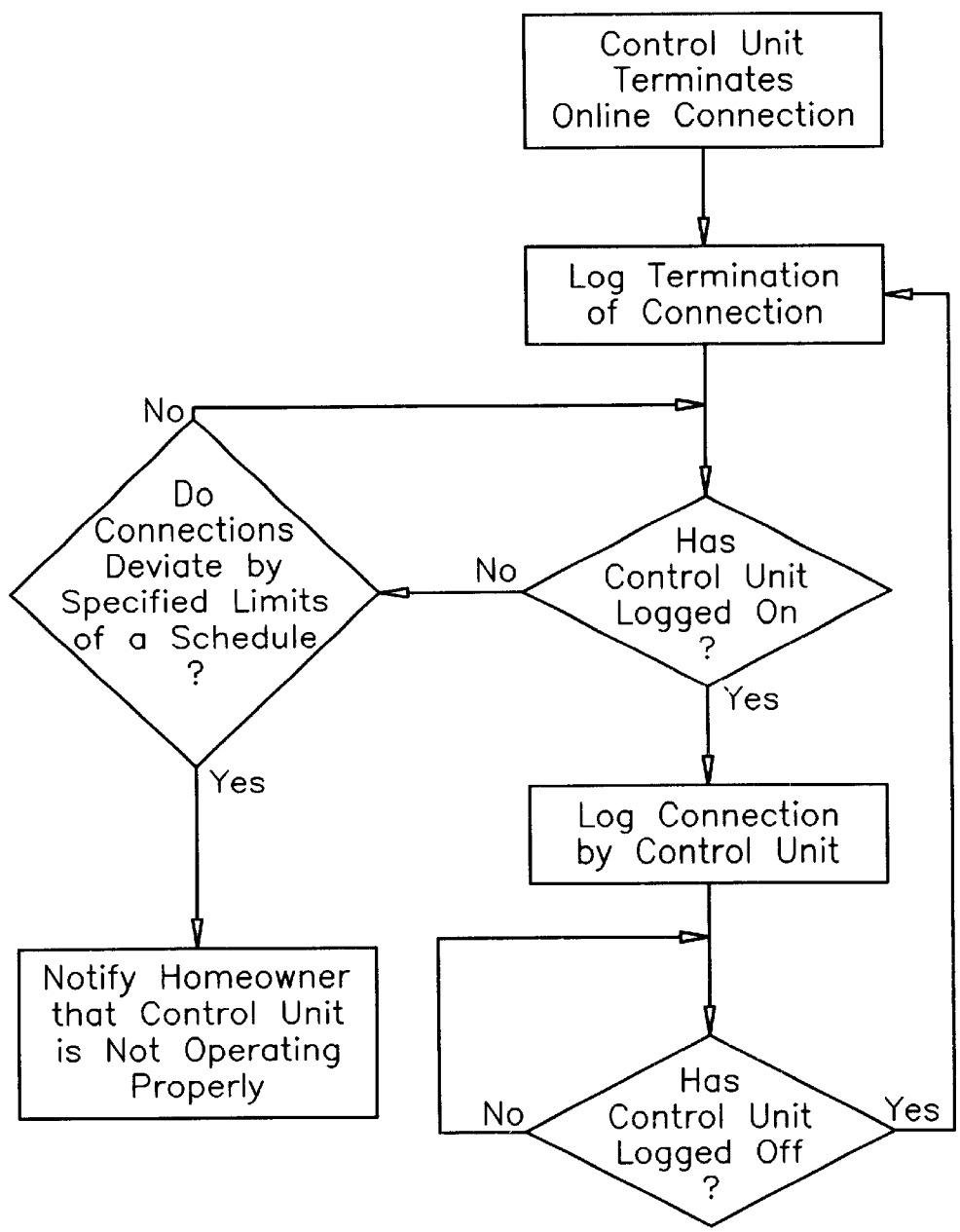
FIG. 11 is a flowchart showing the operation of the data center monitoring the online connections from the control unit.

As shown in FIG. 11 of the drawings, the data center 20 monitors the logon activity of the control unit 30. If the control unit 30 deviates from the specified limits of a schedule, the data center 20 may notify the homeowner that the control unit 30 is not connecting to the data center 20 as scheduled and that there may be problems with the control unit 30.

D. Control Devices

Figure 2:
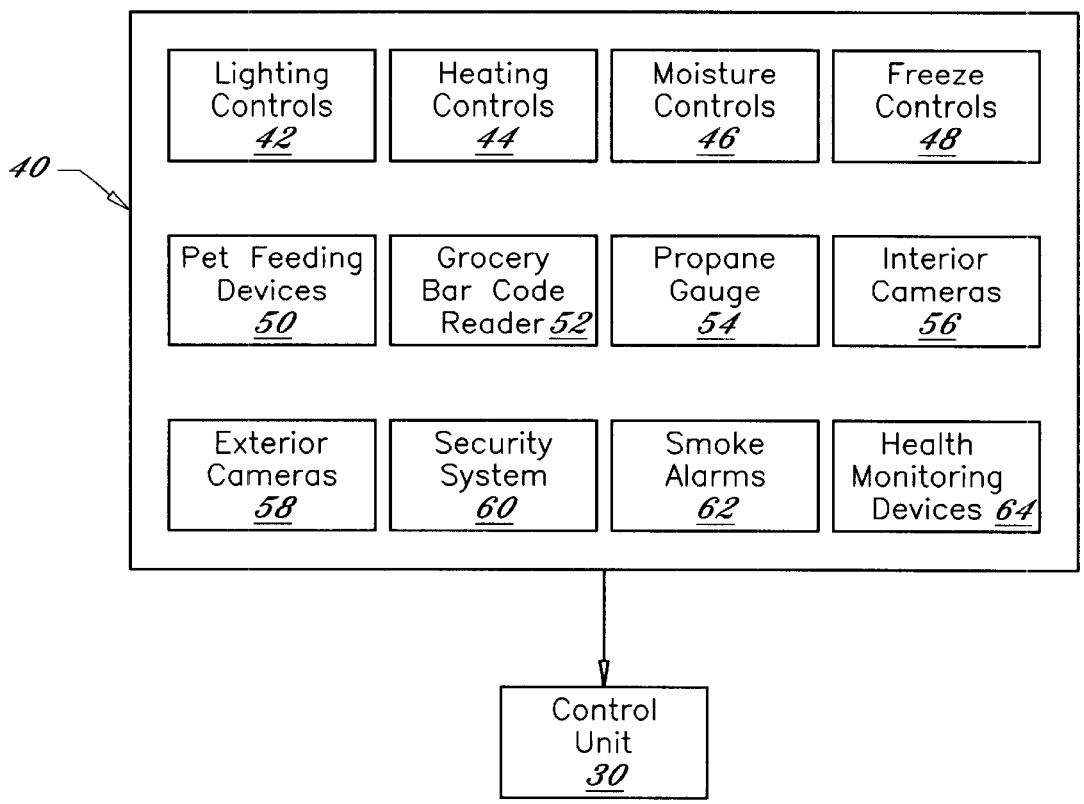
FIG. 2 is a block diagram of the various types of controls that may be connected to the control unit within the home.
Figure 5:
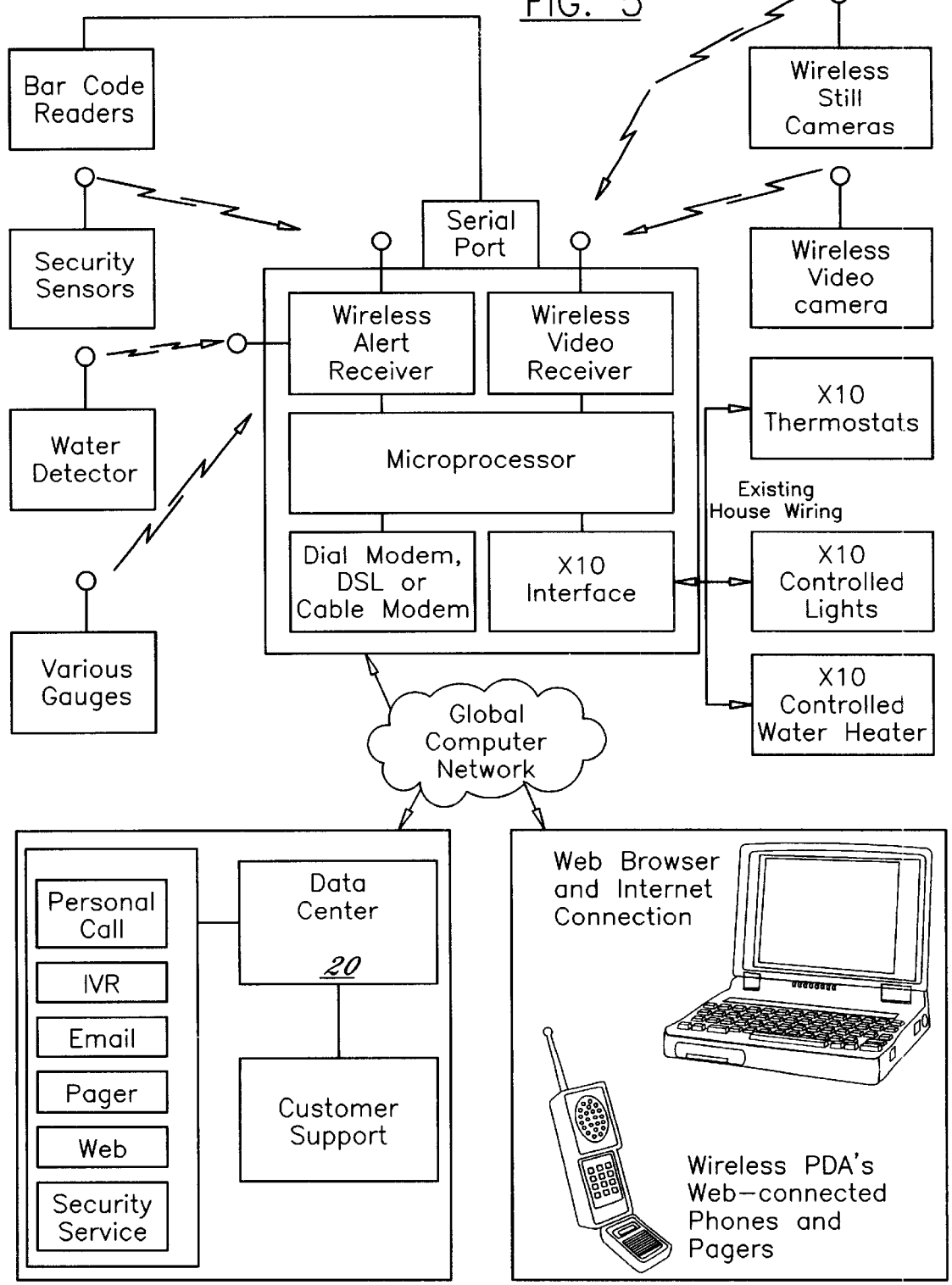
FIG. 5 is a block diagram of the present invention.

As shown in FIG. 2 of the drawings, the control unit 30 is in communication with various control devices 40 such as lighting controls 42, heating controls 44, moisture controls 46, freeze controls 48, pet feeding device, grocery bar code reader 52, propane gauge 54, interior still and video cameras, exterior still and video cameras, security system 60, alarms (smoke, carbon monoxide, etc.), alerts and other control devices 40. As shown in FIG. 5 of the drawings, the control unit 30 is in communication with the control devices 40 through various means such as radio, infrared, cable, X10 or other known communication means.

The control devices 40 may be capable of receiving, storing and transmitting data to and from the control unit 30 depending upon the desired usage. For example, the lighting controls 42 would mainly receive data from the control unit 30 directing the lighting controls 42 to turn on specific lighting or to turn off specific lighting. It can be appreciated that the lighting controls 42 may be capable of transmitting data to the control unit 30 regarding which lights are activated and deactivated which is forward to the data center 20 through global computer network 12. The various other control devices 40 are capable of receiving, storing and transmitting data as required for their specific operation and programming.

E. Alerts and Events

A specific type of control device 40 may be utilized which provides merely an "alert" as to specific conditions within the home as shown in FIG. 5 of the drawings. For example, a grocery bar code reader 52 can be utilized to monitor the supply of groceries within the home, a propane gauge 54 to monitor the level of propane within a tank, smoke alarms 62 to monitor fire conditions within the home, a security system 60 to monitor the home for intrusions, and pet feeding devices 50 to monitor the supply of food for a pet.

Figure 6:
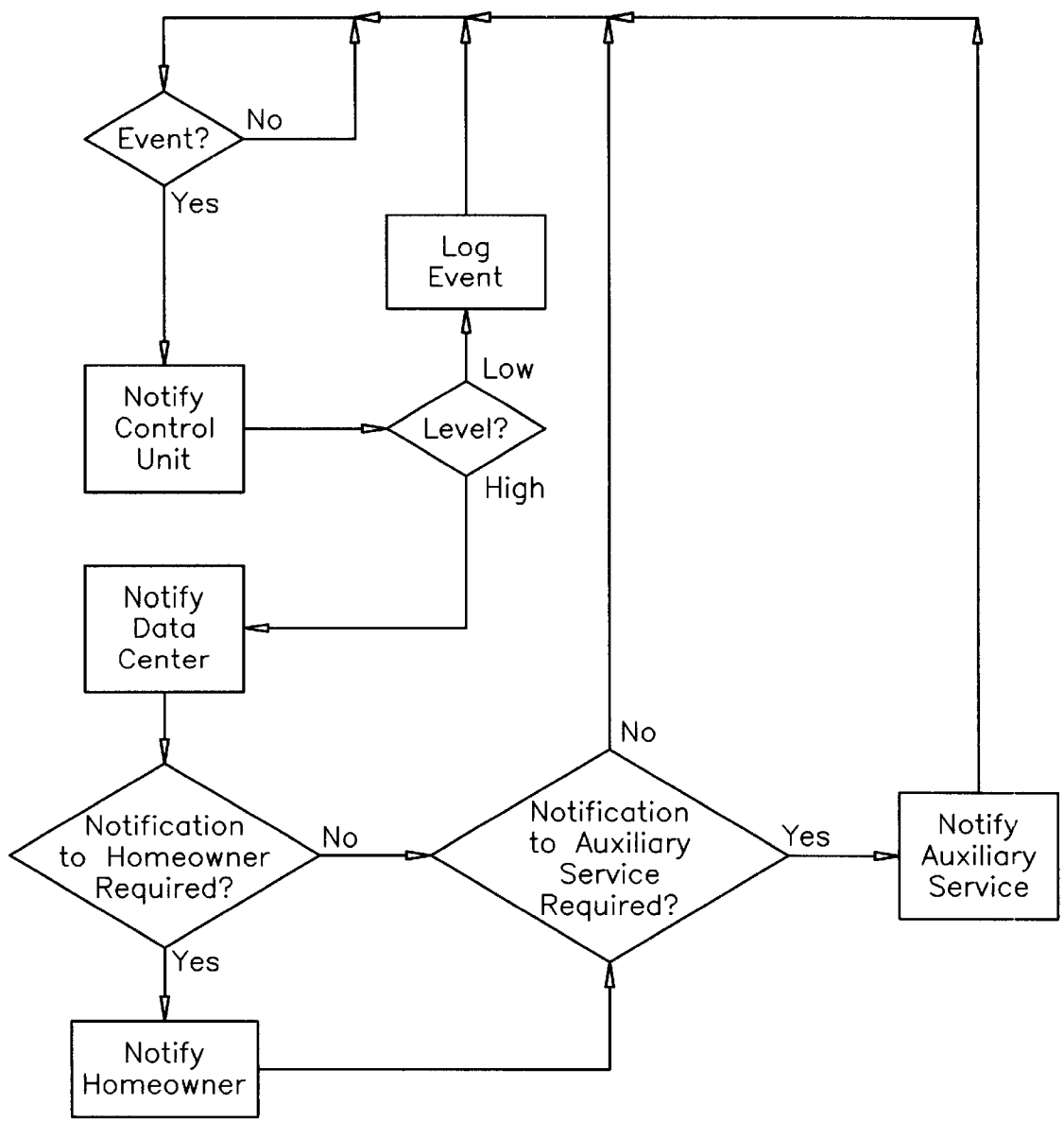
FIG. 6 is a flowchart showing the operation of the present invention when an event occurs at the home.

When the groceries, propane, smoke, security conditions and pet food within the home reach a preprogrammed threshold level, an alert signal is transmitted to the control unit 30 by the specific control device 40 signaling that a threshold condition has been breached. As shown in FIG. 6 of the drawings, if the event is a "LOW LEVEL" event, the control unit 30 simply logs the event for later reporting. If the event is a "HIGH LEVEL" event, the control unit 30 may notify the data center 20 which can then notify the homeowner of the condition via e-mail, pager, web page, by direct telephone call or other communication means. The control unit 30 or the data center 20 may also notify auxiliary services 80 through the global computer network 12 that the home is in need of specific supplies such as food, pet food or propane, or that a security breach has occurred so that the appropriate services or goods may be provided.

F. Modes

Figure 9:
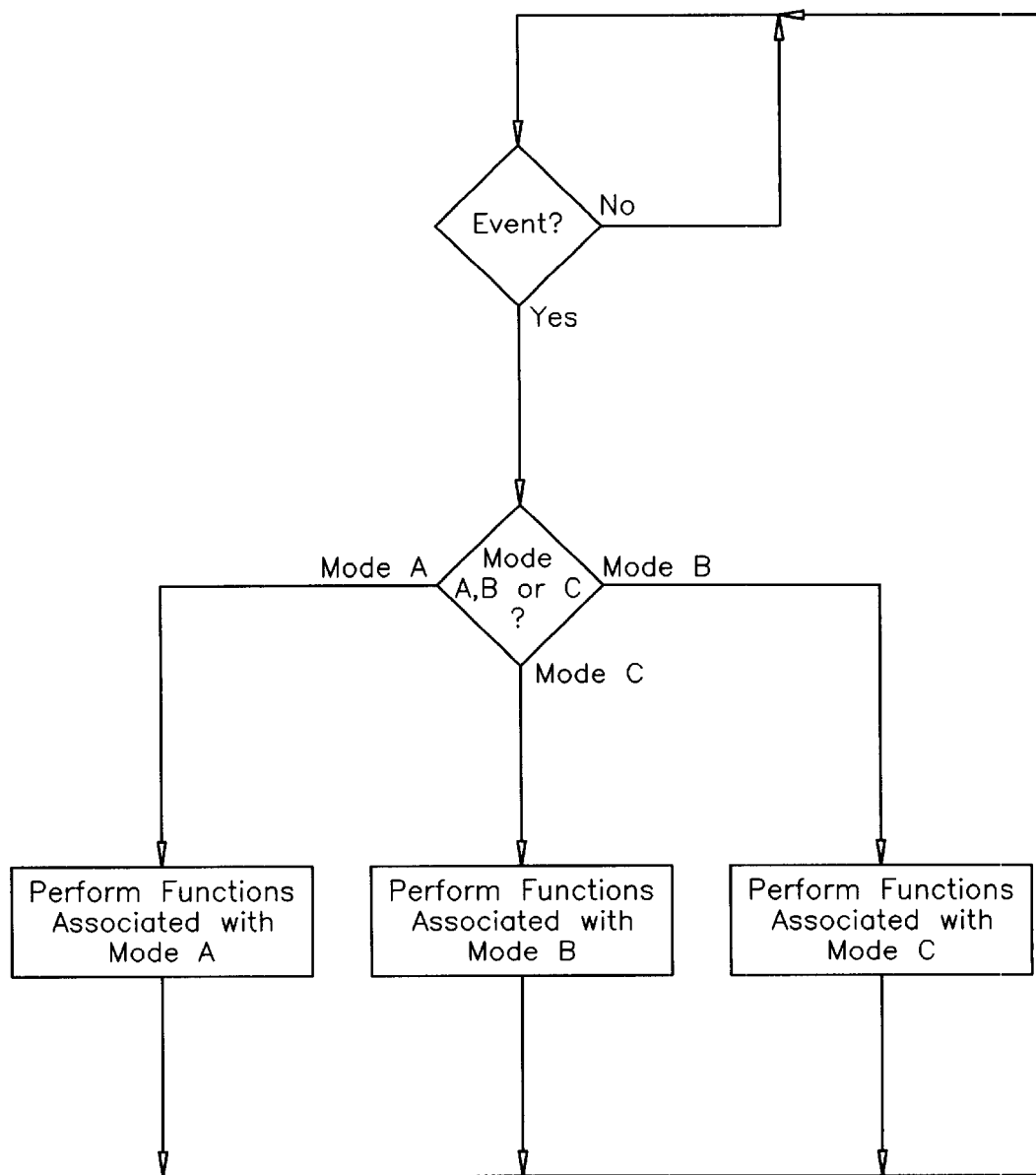
FIG. 9 is a flowchart showing operation of the control unit upon receiving an event utilizing the various modes that may be programmed into the control unit.

As shown in FIG. 9 of the drawings, there can be more than one "mode" for the control unit 30 to have depending upon various factors. For example, there may be a "HOME" mode for use when the user is at home, an "AWAY" mode when the user is away from home, and a "SLEEP" mode for nighttime hours. There may also be various "routines" within each of the above-stated modes such as a "WEEKEND" routine, "WEEKDAY" routine, and a "VACATION" routine.

When an event is detected and reported to the control unit 30 by one of the control devices 40 such as the security system 60, the control unit 30 first determines which mode it is currently in. For example, if in HOME mode, the control unit 30 may only provide an audible alarm within the interior of the home. If in AWAY mode, the control unit 30 may turn on the lights within the home, connect online to signal a security agency, and contact the homeowner directly. If in SLEEP mode, the control unit 30 may turn on the lights within the home and simultaneously sound an audible alarm. As can be appreciated, there are various combinations that may be achieved with the various modes programmable into the control unit 30.

G. Control Page

Figure 3:
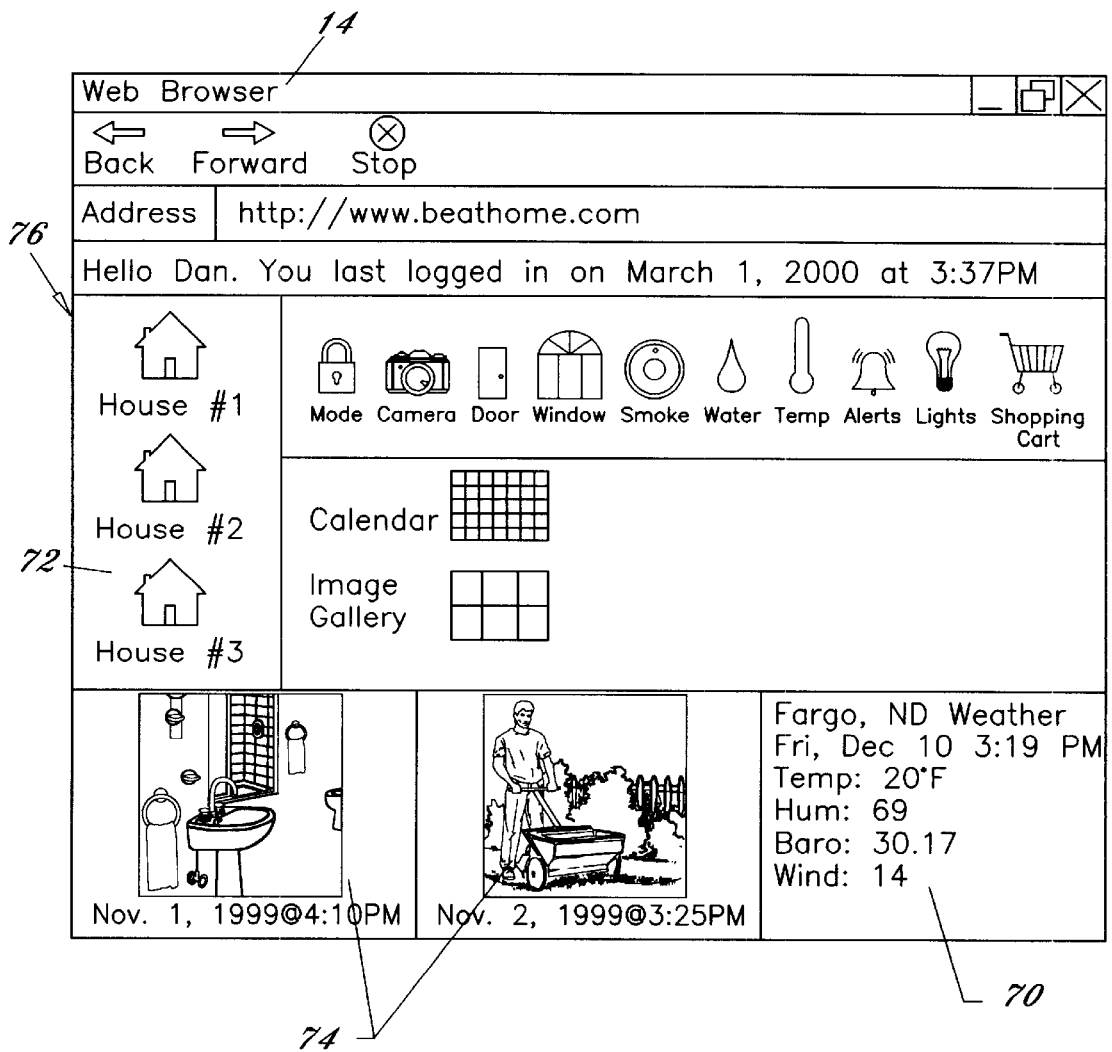
FIG. 3 is a browser containing the control page displaying some of the features of the present invention that allow the homeowner to monitor and control their home through a global computer network such as the Internet.
Figure 4:
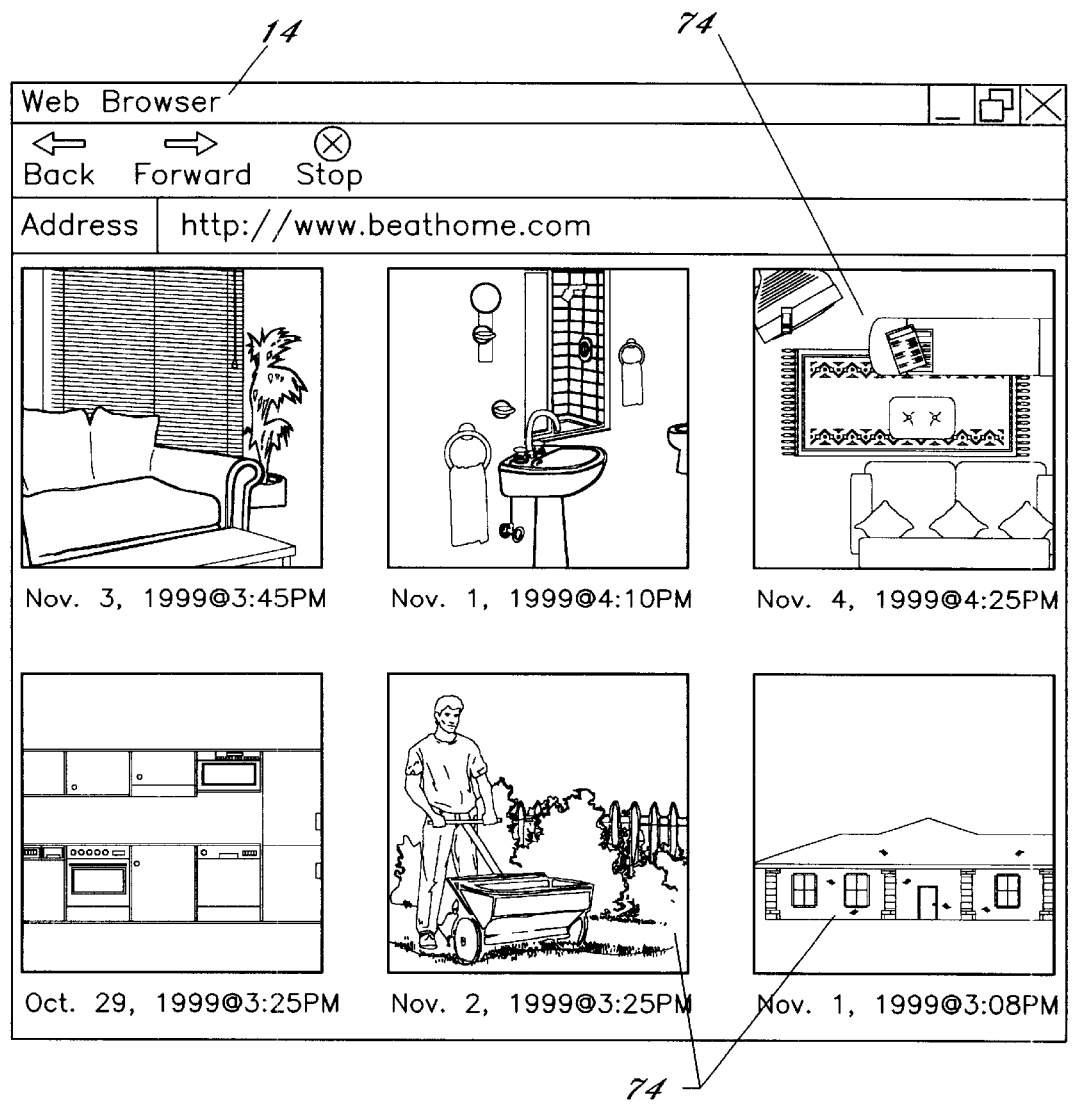
FIG. 4 is a sample Internet web page displaying various pictures taken from cameras within and outside of the home.

As shown in FIGS. 1, 3 and 4 of the drawings, the homeowner can access data regarding their home through a conventional web browser 14 upon the user's computer. The homeowner can access their specific "control page" 76 upon the web site by using a user name and password or any other acceptable means for accessing the data from their home. The control page 76 can have various structures, design and information available for the homeowner. In addition, the control page 76 may be customizable for allowing only the desired information upon the control page 76 such as the customized information 70 portion of the control page 76. The control page 76 may be customized to display one or more images 74 of a specific home along with customized information 70 relating to weather conditions and other information.

The homeowner can select which home they desire to receive data from by selecting the appropriate home within the home selector 72. As shown in FIG. 4 of the drawings, the homeowner can view images 74 of the interior and exterior of their home through the web browser 14 by selecting the section containing the images 74. The user can view either still images 74 or video images 74 as desired. It can be appreciated that various other features may be utilized for monitoring the images 74 of the home.

H. Modifying Control Unit Settings

Figure 7:
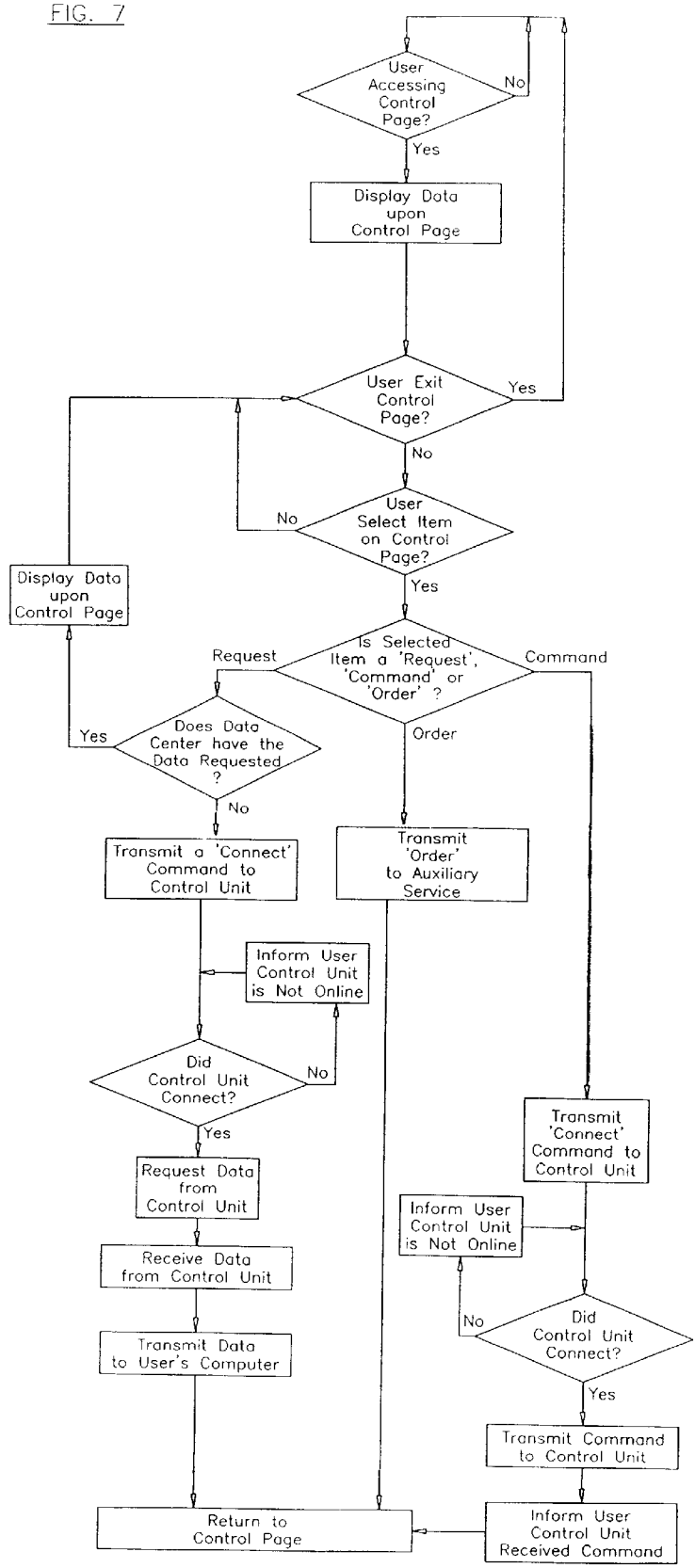
FIG. 7 is a flowchart showing the operation of the present invention when the homeowner accesses the control page from a computer through the global computer network entering a "request" or a "command".

If the homeowner desires to modify any preprogrammed settings within the home, such as lighting control or thermostat control, the homeowner simply selects the desired feature upon the control page 76 of the desired home as shown in FIGS. 3 and 7 of the drawings. The homeowner may then enter the desired data into the computer 16 which is transmitted to the data center 20 which forwards the information directly to the control unit 30 which transmits the data accordingly modifying any previous settings. This process continues until the user logs out of the control page 76.

I. Data Manipulation

The control unit 30 and the data center 20 constantly monitor data received from the control devices 40 during usage. The data accumulated, such as gas and electricity consumption, may be compiled to locate inconsistencies and deviations. For example, if the electricity consumption within the home increases by 10% over a period of time a warning may be provided to the homeowner informing them of the deviation. It can be appreciated that various other types of data manipulation may be utilized with the present invention.

J. Control Unit Security

It is an essential feature of the present invention that the control unit 30 always connects to the data center 30 and that the control unit 30 cannot be directly connected to for preventing unauthorized access to the control unit 30. As shown in FIG. 7 of the drawings, when the homeowner accessing the control page 76 enters a "REQUEST, "COMMAND", or "ORDER" the data center 20 sends a "connect" command to the control unit 30. If online, the control unit 30 will then establish a direct connection with the data center 20 thereby allowing the control unit to connect only to the authorized data center 20 and not an unauthorized party.

K. Operation

In use, the user programs the desired settings into the control unit 30 either directly at the home or via the data center 20 through an external computer 16. As shown in FIG. 6 of the drawings, when a condition within the home reaches a warning level (i.e. an "event") such as low propane, the control unit 30 sends an alert to the data center 20 through the global computer network 12. The data center 20 may notify an auxiliary service such as a fire department or propane store informing them of the home's condition. The data center 20 would also provide relevant information to the auxiliary service regarding the home such as the owner's name, telephone number, address of the home and other relevant information. In addition, the data center 20 may also send an alert to the homeowner through various types of communication means such as e-mail, pager, warning upon the control page 76, personal call or other communication means.

The homeowner may connect to the data center 20 through a conventional web browser 14 or other software program through a computer 16 as shown in FIGS. 3 and 7 of the drawings. The homeowner may have a home that is shown as a default upon the control page 76. However, the homeowner may also select a home to view information about if they have more than one home connected to the data center 20 with a control unit 30. The homeowner may then select which home they desire to either "request" information about or provide a "command" to. If the homeowner simply desires to receive information about a home, they can select the item that they desire to receive information about such as the interior temperature of the home or images 74 within the home. As shown in FIG. 7 of the drawings, the data center 20 transmits a "connect" command to the control unit 30. If the control unit 30 is online and receives the connect command, the control unit 30 then transmits a connected signal to the data center 20 thereby establishing a secure connection to the control unit 30. The data center 20 may then request from the control unit 30 the desired information if not currently updated. The control unit 30 then uploads the requested data to the data center 20 and receives any commands from the data center 20 that the homeowner previously programmed into the data center 20 through the control page 76. The data center 20 then transmits to the homeowner the desired data for viewing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Internet Based Home Communications System

Environmental Elements

10. Internet Based Home Communications
11.
12. Global Computer Network (Internet)
13.
14. Browser
15.
16. User's Computer
17.
18.
19.
20. Data Center
21.
22.
23.
24.
25.
26.
27.
28.
29.
30. Control Unit
31.
32.
33.
34.
35.
36.
37.
38.
39.
40. Control Devices
41.
42. Lighting Controls
43.
44. Heating Controls
45.

46. Moisture Controls
47.
48. Freeze Controls
49.
50. Pet Feeding Device
51.
52. Grocery Bar Code Reader
53.
54. Propane Gauge
55.
56. Interior Cameras
57.
58. Exterior Cameras
59.
60. Security System
61.
62. Smoke Alarms
63.
64. Health Monitoring Devices
65.
66.
67.
68.
69.
70. Customized Information
71.
72. Home Selector
73.
74. Images
75.
76. Control Page
77.
78.
79.
80. Auxiliary Services

We claim:

1. An Internet based home communications system, comprising:
   a control unit in communication with at least one control device, wherein said control unit is capable of being in communication with a global computer network; and
   a data center in communication with said control unit through said global computer network, wherein said data center provides a control page through said global computer network for a user to access, said control page including a home selector section allowing said user to select between multiple homes.

2. The Internet based home communications system of claim 1, wherein said control unit provides alerts to said data center when a restriction is violated.

3. The Internet based home communications system of claim 2, wherein said data center provides alerts to said user through a communication means.

4. The Internet based home communications system of claim 3, wherein said communication means is comprised of e-mail.

5. The Internet based home communications system of claim 3, wherein said communication means is comprised of a notice upon said control page.

6. The Internet based home communications system of claim 1, wherein said at least one control device is comprised of at least one interior camera.

7. The Internet based home communications system of claim 6, wherein said at least one control device includes at least one exterior camera.

8. The Internet based home communications system of claim 7, wherein said interior camera and said exterior camera are capable of providing video images.

9. The Internet based home communications system of claim 8, wherein said at least one control device further includes at least one lighting control, at least one temperature control, at least one moisture control, at least one freeze control, at least one pet feeding device, at least one grocery bar code reader, at least one propane gauge, at least one security system, at least one smoke alarm and at least one carbon monoxide alarm.

10. The Internet based home communications system of claim 1, wherein said at least one control device includes a security system.

11. The Internet based home communications system of claim 1, wherein said control page is customizable.

12. The Internet based home communications system of claim 1, wherein said control unit is programmable from said control page by said user.

13. The Internet based home communications system of claim 12, wherein said control unit controls said at least one control device.

14. The Internet based home communications system of claim 1, wherein said control unit accesses said global computer network at periodic intervals.

15. The Internet based home communications system of claim 1, wherein said data center stores still images and video images received from said control unit.

16. The Internet based home communications system of claim 15, wherein said data center provides an image gallery for said user to view containing said stored still images and said video images.

17. The Internet based home communications system of claim 1, wherein said at least one control device is capable of receiving data, storing data and transmitting data through said global communications network.

18. The Internet based home communications system of claim 1, wherein said data center forwards said alerts to an appropriate auxiliary service.

19. The Internet based home communications system of claim 18, wherein said alerts contain home information, wherein said home information includes address and homeowner information.

20. An Internet based home communications system, comprising:
    a control unit in communication with at least one control device within a home, wherein said control unit is capable of being in communication with a global computer network;
    a data center in communication with said control unit through said global computer network;
    a control page provided by said data center through said global computer network for a user to access; and
    wherein said control page includes access by said user to more than one home through a home selector section, and wherein said control page is customizable.

21. The Internet based home communications system of claim 20, wherein said control unit provides alerts to said data center when a restriction is violated.

22. The Internet based home communications system of claim 21, wherein said data center provides alerts to said user through a communication means.

23. The Internet based home communications system of claim 22, wherein said communication means is comprised of e-mail.

24. The Internet based home communications system of claim 22, wherein said communication means is comprised of a notice upon said control page.

25. The Internet based home communications system of claim 22, wherein said control unit controls said at least one control device.

26. The Internet based home communications system of claim 20, wherein said at least one control device is comprised of at least one interior camera.

27. The Internet based home communications system of claim 26, wherein said at least one control device includes at least one exterior camera.

28. The Internet based home communications system of claim 27, wherein said interior camera and said exterior camera are capable of providing video images.

29. The Internet based home communications system of claim 28, wherein said at least one control device further includes at least one lighting control, at least one temperature control, at least one moisture control, at least one freeze control, at least one pet feeding device, at least one grocery bar code reader, at least one propane gauge, at least one security system, at least one smoke alarm and at least one carbon monoxide alarm.

30. The Internet based home communications system of claim 20, wherein said at least one control device includes a security system.

31. The Internet based home communications system of claim 20, wherein said control page includes a home selector section allowing said user to select between multiple homes.

32. The Internet based home communications system of claim 20, wherein said control page is customizable from a conventional web browser.

33. The Internet based home communications system of claim 20, wherein said control unit is programmable from said control page by said user.

34. The Internet based home communications system of claim 20, wherein said control unit accesses said global computer network at periodic intervals.

35. The Internet based home communications system of claim 20, wherein said data center stores still images and video images received from said control unit.

36. The Internet based home communications system of claim 26, wherein said data center provides an image gallery for said user to view containing said stored still images and said video images.

37. The Internet based home communications system of claim 20, wherein said at least one control device is capable of receiving data, storing data and transmitting data through said global communications network.

38. The Internet based home communications system of claim 20, wherein said data center forwards said alerts to an appropriate auxiliary service.

39. The Internet based home communications system of claim 29, wherein said alerts contain home information, wherein said home information includes address and home-owner information.

40. An Internet based home communications system, comprising:

a control unit in communication with at least one control device within a home, wherein said control unit is capable of being in communication with a global computer network;

a data center in communication with said control unit through said global computer network; and a control page provided by said data center through said global computer network for a user to access, wherein said control page includes access by said user to more than one home through a home selector section and wherein said control page is customizable, wherein said control page is customizable from a conventional web browser;

wherein said control unit provides alerts to said data center when a restriction is violated;

wherein said data center provides said alerts to said user through a communication means;

wherein said alerts contain home information, wherein said home information includes address and home-owner information;

wherein said at least one control device is comprised of at least one interior camera and at least one exterior camera, wherein said interior camera and said exterior camera are capable of providing video images;

wherein said control page includes a home selector section allowing said user to select between multiple homes;

wherein said control unit is programmable from said control page by said user;

wherein said control unit accesses said global computer network at periodic intervals;

wherein said data center stores still images and video images received from said control unit;

wherein said data center provides an image gallery for said user to view containing said stored still images and said video images;

wherein said at least one control device is capable of receiving data, storing data and transmitting data through said global communications network;

wherein said data center forwards said alerts to an appropriate auxiliary service.

41. The Internet based home communications system of claim 40, wherein said at least one control device further includes at least one lighting control, at least one temperature control, at least one moisture control, at least one freeze control, at least one pet feeding device, at least one grocery bar code reader, at least one propane gauge, at least one security system, at least one smoke alarm and at least one carbon monoxide alarm.

\* \* \* \* \*